Patented Nov. 12, 1946

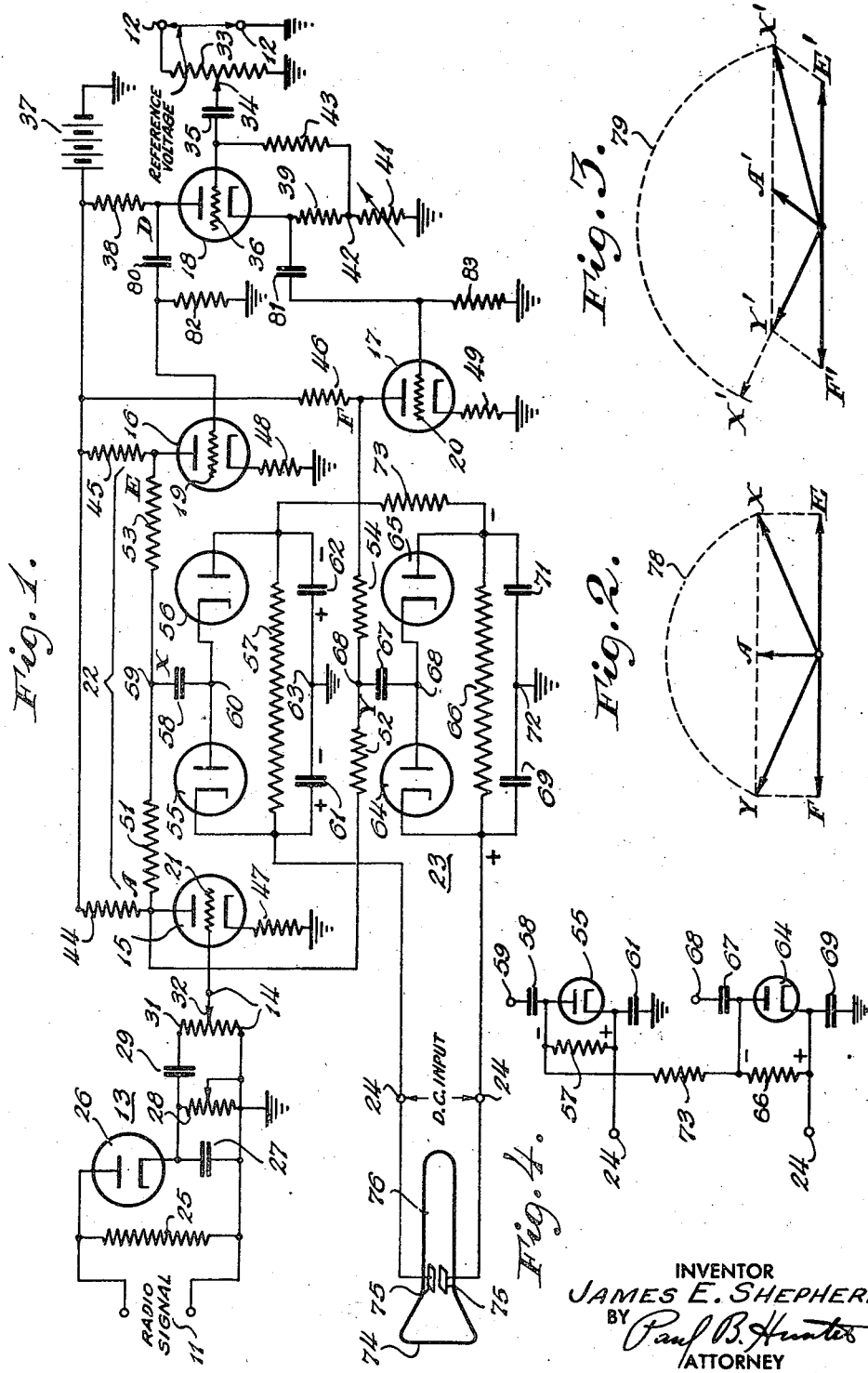

2,410,843

UNITED STATES PATENT OFFICE 2,410,843

PHASE SENSITIVE APPARATUS

James E. Shepherd, Hempstead, N. Y., assignor to Sperry Gyroscope Company, Inc., a corporation of New York Application June 21, 1943, Serial No. 491,623

5 Claims. (Cl. 172—245)

My invention relates to phase responsive apparatus and concerns particularly methods and apparatus for indicating phase relationship between alternating electrical quantities and controlling other apparatus in accordance with such variations in phase.

An object of my invention is to eliminate the necessity for the use of transformers in phase responsive apparatus.

Another object of my invention is to provide a means for simultaneous amplification of input signals and indication of phase relationship between them.

Still another object of my invention is to provide a method for vectorially combining electrical input quantities without interaction between the input circuits or reaction from the load circuits upon the input circuits.

Furthermore, it is an object of my invention to provide an arrangement for combination of currents proportional to input voltages.

Other and further objects and advantages will become apparent as the description proceeds.

In carrying out my invention in its preferred form, for comparing a reference voltage and a signal voltage in phase, I provide a pair of vacuum tube amplifiers with parallel output connections, with a signal voltage input to one amplifier and a reference voltage input to the other amplifier. An asymmetric or non-linear circuit, such as a rectifier, is included in the common output circuits for producing a unidirectional voltage representing the vectorial combination of the input voltages. A third vacuum tube amplifier is also provided with an input corresponding to one of the first-mentioned input voltages but of opposite polarity. The output of one of the first tubes is combined with the output of the third tube in a second non-linear or asymmetric circuit for producing a second unidirectional voltage representing the vectorial combination of the two input voltages. The polarized or unidirectional output circuits are connected in opposition to a pair of output terminals at which a direct voltage or direct current appears which varies in polarity and magnitude with variations in phase relationship between the input circuits.

A better understanding of the invention will be afforded by the following detailed description considered in connection with the accompanying drawing, and those features of the invention which are believed to be novel and patentable will be pointed out in the claims appended hereto.

In the drawing,

Fig. 1 is a circuit diagram of one embodiment of my invention;

Fig. 2 is a vector diagram illustrating the principle of operation of the invention when the two input voltages are in phase quadrature;

Fig. 3 is a vector diagram illustrating the principle of operation of the invention when the input voltages are out of phase but depart considerably from phase quadrature; and Fig. 4 is a fragmentary circuit diagram of a modification in the arrangement of Fig. 1.

Fig. 1 illustrates a phase responsive circuit which may be used, for example, in connection with spinning-scanner type of radio locator apparatus for indicating the phase relationship between the modulation envelope of a radio signal and a reference voltage provided for the purpose of affording a basis of comparison, such variations in the phase of the modulation envelope occurring when an object to be located varies in orientation. However, it will be understood that my invention is not limited to any specific application and may be used in connection with various types of apparatus in which a phase relationship is to be indicated or other apparatus is to be operated in accordance with variations in phase relationship between two input voltages.

Referring to Fig. 1, a radio signal from a pulse receiver (not shown) is assumed to be applied to a pair of radio signal input terminals 11, and a reference voltage from a reference voltage generator (not shown) is assumed to be applied to a pair of reference voltage terminals 12. The frequency of the voltage at the terminals 12 is chosen to equal the frequency of modulation of the radio signals or the spin frequency of the scanner. For recovering the modulation envelope of the radio frequency (or video frequency) voltage at the terminals 11, a detector 13 is provided which may be of the peak voltmeter type, for example, having an adjustable voltage output and a pair of detector output terminals 14, at which a spin-frequency signal voltage appears. One of the terminals 14 may be grounded if desired.

For vectorially combining the voltages at the pairs of terminals 12 and 14, an electronic transformation and combination circuit is provided comprising current controlling devices such as triode vacuum tubes 15, 16, 17 and 18. The tube 18 is so connected as to serve as a phase splitter or inverter supplying voltages of opposite polarity to control electrodes or grids 19 and 20, respectively, of the tubes 16 and 17, varying in accordvoltage terminals 12. In the arrangement as illustrated, the signal voltage between the terminals 14 is applied directly to a control electrode 21 of the tube 15. Preferably, the tubes 15, 16 and 17 are so arranged as to act as amplifiers as well as buffer stages, isolating the input voltages from each other and from the output circuits.

A common output circuit 22 is provided for the tubes 15 and 16 which is asymmetric or non-linear in character and may take the form of a single or bi-phase rectifier. A similar rectifying output circuit 23 is provided which is common to the tubes 15 and 17.

Final output terminals 24 are provided at which a voltage appears proportional to the net difference between the outputs of the rectifiers 22 and 23.

The detector or demodulator 13 in the form illustrated comprises a resistor 25 connected across the radio signal terminals 11. A rectifier or diode vacuum tube 26 is in series with a condenser 27 across the input resistor 25, and a time constant adjusting rheostat 28 is connected across the condenser 27. For coupling the rectified voltage or modulation envelope voltage appearing across the condenser 27 to the output terminals 14, a coupling condenser 29 and a potentiometer 31 may be provided. As shown, one end of the potentiometer 31 is grounded, and an adjustable potentiometer tap or brush 32 is provided which is connected to one of the detector output terminals 14.

For adjusting the input magnitude of the reference voltage, a potentiometer 33 may be connected across the reference voltage terminals 12, with an adjustable tap or sliding brush 34 coupled through a condenser 35 to a control electrode or grid 36 of the tube 18. A common power supply represented by a battery 37 may be provided for the triode vacuum tubes illustrated in the drawing.

For causing the tube 18 to act as a phase splitting stage, it is connected to the power supply 37 with load resistors in both anode and cathode circuits, comprising an anode resistor 38 and a cathode resistor divided into two parts 39 and 41 with a junction terminal 42. For negatively biasing the grid 36, a grid leak resistor 43 may be connected between the grid 36 and the cathode resistor junction terminal 42, and for adjustment of the balance between the anode and cathode output voltages, the resistor 41 may be made adjustable. The anode output voltage of the tube 18 is applied to the grid 19 of the tube 16 by means of a condenser 80, and its cathode output voltage is applied to the grid 20 of the tube 17 by means of a condenser 81. Grid-leak resistors 82 and 83 are provided for tubes 16 and 17, respectively.

The tubes 15, 16, and 17 are connected to the power supply 37 through anode load resistors 44, 45 and 46, respectively. In order to provide sufficient degeneration for stabilization, cathode resistors 47, 48, and 49 may also be provided.

One output circuit for the tube 15 comprises a resistor 51 in series with the rectifier circuit 22, and a second output circuit for the tube 15 comprises a resistor 52 in series with the rectifying circuit 23.

An output circuit for the tube 16 comprises a resistor 53 in series with the rectifying circuit 22. The circuit 22 thus forms the common output for the tubes 15 and 16. Similarly, an output circuit for the tube 17 comprises a resistor 54 in series with the rectifying circuit 23, which is thus common to the tubes 15 and 17.

The rectifying circuit 22 comprises a pair of unilateral non-linear or asymmetric elements 55 and 56 connected in series with like polarity, that is, with the cathode of one connected to the anode of the other, and a load resistor 57 to which the elements 55 and 56 are connected in series. A coupling and filtering condenser 58 is connected between a junction terminal 59 of the resistors 51 and 53 and a junction terminal 60 of the rectifiers 55 and 56. For completing the rectifier circuit to ground, since the tubes 15 and 16 are grounded on the cathode side, a pair of coupling and filter condensers 61 and 62 is connected in series across the load resistor 57 with their junction terminal 63 connected to ground.

The rectifying circuit 23 comprises rectifier elements 64 and 65, a load resistor 66, a coupling and filter condenser 67, and a pair of coupling and filter condensers 69 and 71 connected in the same manner as corresponding elements of the rectifying circuit 22. Junction terminal 72, between condensers 69 and 71, is grounded.

The rectifying elements 55, 56, 64 and 65 are so connected that one end, in this case the left-hand end, of each of the resistors 57 and 66 is of the same polarity, namely, positive polarity, and the opposite end is of the opposite polarity, namely, negative polarity. Points of like polarity are connected together. For example, the negative polarity ends of the resistors may be joined by the resistor 73, and the postive terminals of the resistors 57 and 66 are connected to the output terminals 24.

The output terminals 24 may be connected to any suitable indicator or current or voltage responsive device which is to be operated in accordance with variations in phase relationship between the input voltages of the pairs of terminals 12 and 14. For example, a voltage responsive device such as a cathode ray indicator may be employed having a fluorescent screen 74 at the end of a cathode ray oscilloscope tube 76 (indicated herein schematically) containing a pair of deflection plates 75 connected to the output terminals 24 of the phase responsive circuit.

In the circuit illustrated there is no reaction between the voltages at the pairs of terminals 12 and 14 and the circuits connected either of these pairs of terminals are unaffected by any voltage which might be applied to the terminals 24 by an external source, because the tubes 15, 16 and 17 act as buffer stages. Thus circuit isolation is obtained without requiring the use of transformers.

Vectorial current summation is obtained by the tubes having a common output circuit. For example, in the case of the tubes 15 and 16, plate currents are produced proportional respectively to the input voltages applied to the grids 21 and 19. These currents are in turn translated into plate voltages which result in the flow of alternating current components of output current in the resistors 51 and 53, respectively. Since rectifying circuit 22 is connected to the resistors 51 and 53 as a parallel output circuit for the tubes 15 and 16, currents are vectorially combined which are proportional to the input voltages supplied from the pairs of terminals 12 and 14, respectively.

It will be understood that the condensers 58, 61, 62, 67, 69 and 71 should be large enough to have relatively low impedance at the frequencies of the alternating input voltages. Since bi-phase rectifiers are employed, full wave rectifying action is obtained in the circuit. However, if full wave action is not required, one of the rectifier elements may be omitted from each of the circuits 22 and 23. For example, the rectifier tubes 56 and 65 may be omitted. In this case the rectifier circuit connections will be completed as indicated in Fig. 4. Filtering and coupling condensers 62 and 71 are also omitted in case the rectifier elements 56 and 65 are omitted.

The manner in which the circuit output varies in accordance with phase is indicated by vector diagrams of Figs. 2 and 3. If it is assumed that the alternating voltages at the pairs of terminals 14 and 12 are in phase quadrature, the anode signal voltage at the tubes 15, 16, and 17, represented by the letters A, E, and F will have the relationship indicated in Fig. 2. The voltages E and F will, of course, be in phase opposition as a result of the use of the phase splitting inversion stage 18. The resultant of the vectors A and E or the voltage of the point 59 will be the vector resultant represented in Fig. 2 by the vector X. Likewise the resultant of the voltages A and F will be the voltage of the point 68, represented by the vector Y. The resultant voltages X and Y have the same magnitude and, when rectified, act in opposition so that zero output voltage appears between the output terminals 24. The equality of the scalar values of X and Y is represented in Fig. 2 by the dotted arc 78.

If it is assumed that the input voltages at the pairs of terminals 12 and 14 are not in quadrature, the outputs of the rectifying circuits 22 and 23 will not be balanced. This is illustrated by the vector diagram of Fig. 3 where the voltages at the anodes of the tubes 15, 16, and 17 are represented by vectors A', E', and F'. As indicated by the arc 79, the resultant X' of the voltages A' and E' is substantially greater than the resultant Y' of A' and F'. Consequently, when the voltages X' and Y' are rectified and act in series opposition, a substantial unbalance will occur, and a voltage will be supplied to the output terminals 24 which varies in polarity and magnitude with the departure from quadrature phase relationship between voltages at the pairs of input terminals 12 and 14.

I have herein shown and particularly described certain embodiments of my invention and certain methods of operation embraced therein for the purpose of explaining its principle of operation and showing its application, but it will be obvious to those skilled in the art that many modifications and variations are possible, and I aim, therefore, to cover all such modifications and variations as fall within the scope of my invention which is defined in the appended claims.

What is claimed is:

1. A phase-responsive system comprising, in combination, two pairs of input terminals to which two voltages may respectively be applied which are to be compared in phase, an electronic mixer circuit having input connections from said input terminals and an output connection with a rectifier therein, a second electronic mixer circuit with an input connection from one pair of said terminals, and means including a phase inverter for connecting the other pair of said terminals to said second mixer circuit, said second mixer circuit also having an output connection with a rectifier therein, said rectifiers having output terminals to which they are connected in opposition whereby the net output varies in polarity and magnitude in accordance with variations in phase relationship.

2. A phase-responsive system comprising, in combination, two pairs of input terminals to which two voltages may respectively be applied which are to be compared in phase, a first mixer with input connections from said terminals and an asymmetric output circuit, a second mixer with input connections from said terminals and an asymmetric output circuit, and a pair of output terminals to which said asymmetric output circuits are connected in opposition, the input connections from one of said pairs of input terminals comprising a current-controlling device with a control element coupled to the said pair of input terminals, an anode, a cathode, anode and cathode load impedances, and couplings from the anode and the cathode for supplying opposite polarity inputs to said mixers from said pair of input terminals.

3. In combination, a first electric control device responsive to an alternating quantity, a second electric control device responsive to a second alternating quantity to be compared in phase with the first, means for vectorially combining the alternating outputs of said control devices, a third electric control device responsive to the second alternating quantity, means for vectorially combining the outputs of the first and third electric control devices, a phase-splitter connected in advance of said second and third electric control devices for causing opposite polarity effects therein in response to the second alternating quantity, means for separately rectifying the said two vectorially combined outputs, and means for opposing the rectified outputs.

4. A phase-responsive system comprising in combination first and second pairs of input terminals to which two voltages may respectively be applied which are to be compared in phase; system output terminals; an electronic inversion circuit with an input from the second of said pairs of input terminals and with opposite polarity output terminals; an electronic mixer with an input conectnion from the first of said pairs of input terminals, an input connection from one of the inversion circuit output terminals, and output connections including a first rectifier; and a second electronic mixer circuit with an input connection from the remaining inversion circuit output terminal, an input connection from the first of said pairs of input terminals, and output connections including a second rectifier; said rectifiers being connected in opposition to said system output terminals.

5. A phase-responsive system comprising, in combination: two pairs of input terminals to which two voltages, to be compared in phase, may respectively be applied; a first mixer with input connections from said terminals and with an output including a first asymmetric circuit; a second mixer with input connections from said terminals, the connection from one pair of said terminals being reversed, and with an output including a second asymmetric circuit; and output terminals to which said asymmetric circuits are connected in series opposition.

JAMES E. SHEPHERD.